No. 732,048. PATENTED JUNE 30, 1903.
J. A. COBURN.
MEANS FOR HOLDING CYLINDRICAL TOOL SHANKS.
APPLICATION FILED SEPT. 13, 1902.
NO MODEL.

Witnesses:
Walter E. Lombard
E. Batchelder

Inventor:
Joseph A. Coburn,
by Wright, Brown & Quinby
Attys.

No. 732,048. Patented June 30, 1903.

UNITED STATES PATENT OFFICE.

JOSEPH A. COBURN, OF NORWOOD, MASSACHUSETTS, ASSIGNOR OF ONE-THIRD TO HARVEY E. FARRINGTON, OF NORFOLK, MASSACHUSETTS.

MEANS FOR HOLDING CYLINDRICAL TOOL-SHANKS.

SPECIFICATION forming part of Letters Patent No. 732,048, dated June 30, 1903.

Application filed September 13, 1902. Serial No. 123,299. (No model.)

*To all whom it may concern:*

Be it known that I, JOSEPH A. COBURN, of Norwood, in the county of Norfolk and State of Massachusetts, have invented certain new and useful Improvements in Means for Holding Cylindrical Tool-Shanks, of which the following is a specification.

This invention relates to means for holding drills, augers, milling and tapping tools, &c., in machines for imparting rotary motion to such tools; and it consists in the improvements which I will now proceed to describe and claim.

Figure 1:
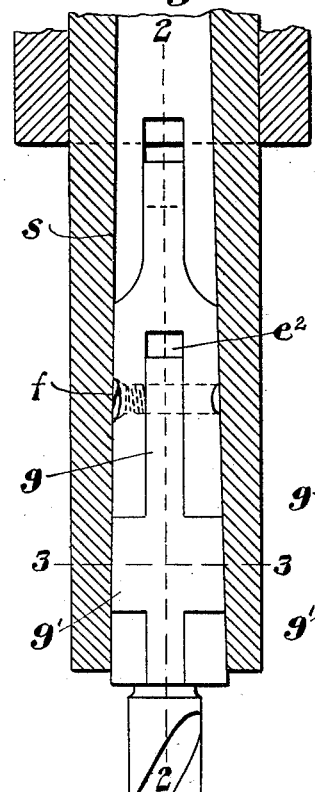
Figure 2:
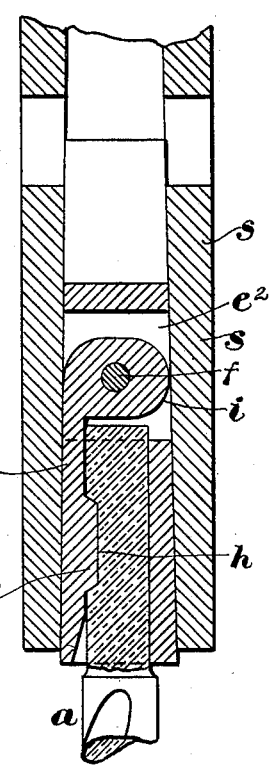
Figure 4:
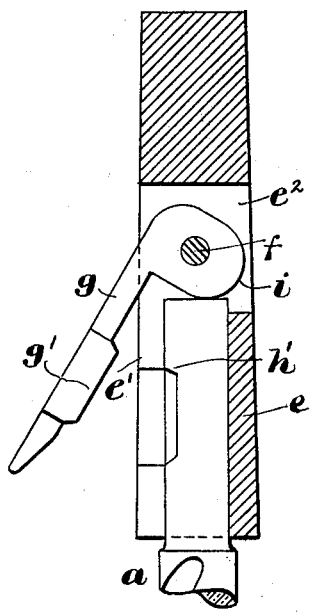
Figure 3:
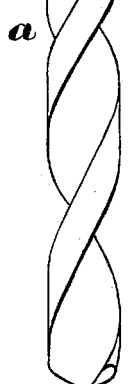

Of the accompanying drawings, forming a part of this specification, Figure 1 represents a side elevation of a tool-holder embodying my invention and a tool therein. Fig. 2 represents a section on line 2 2 of Fig. 1. Fig. 3 represents a section on line 3 3 of Fig. 1. Fig. 4 represents a view of the chuck shown in Figs. 1 and 2 removed from the containing-sleeve and representing the operation of ejecting the tool-shank from the chuck.

The same reference characters indicate the same parts in all the figures.

Referring to Figs. 1, 2, 3, and 4, $e$ represents a chuck which has a cylindrical tapering periphery and is adapted to be inserted in a correspondingly-tapered socket in a sleeve $s$, which, as here shown, is an ordinary drill-press spindle forming a part of a drill-press or drilling-machine and adapted to be rotated in the usual manner to impart rotation to the chuck $e$ and to a drill $a$, affixed thereto. The chuck is provided with a longitudinal slot $e'$, which communicates with the tool-shank-receiving socket of the chuck and is extended at one end, as shown at $e^2$, so that it passes through or across the chuck. $g$ represents a finger which is pivoted at $f$ to the chuck within the slot portion $e^2$ and is formed to swing into and out of the slot portion $e'$. The finger $g$ is provided with a projection $g'$, which projects into the socket of the chuck when the finger is in the position shown in Figs. 1, 2, and 3, said projection being adapted to engage a recess $h$, formed in the shank of the drill $a$. Said recess is provided at the end nearest the upper end of the drill-shank with an inclined or beveled face $h'$. When the projection $g'$ enters the socket of the chuck, it strikes the beveled face $h'$, and in case the shank has not been fully inserted in the socket the contact of the projection $g'$ with the beveled face $h'$ causes the shank to move inwardly to the extreme limit of its inward movement. The finger $g$ is formed at its inner portion, which surrounds the pivot $f$, as a cam $i$, adapted when the finger is swung outwardly, as shown in Fig. 4, to bear against the end of the tool-shank and force the latter outwardly from its seat in the chuck, thus enabling the tool to be readily withdrawn or to drop from the chuck by gravitation. The finger $g$ is formed so that when it is in its operative position, as shown in Figs. 1, 2, and 3, its outer surface is substantially flush with the outer surface of the chuck, so that the chuck and finger can be inserted in an ordinary spindle $s$ without requiring any change or modification of the latter.

As hereinbefore pointed out, the bore of the spindle $s$ and the outer surface of the holder are each tapered to oppose each other and form a frictional engagement of said parts, this engagement being maintained under the vertical pressure of the tool in operation. In addition, however, this increasing binding or frictional engagement of the spindle and holder has a direct result on the holding of the tool-shank in position in that such increased frictional engagement of these parts forces the projection $g'$ into a closer engagement with the tool-shank. This result is due to the fact that the surface of the tongue is intended to be flush with and form a continuation of the cylindrical surface of the holder when in position, and hence is affected by the increase of pressure of the spindle during the vertical or longitudinal movement thereof. Should it happen, therefore, that in entering the holder in the spindle the proper engagement of the tool shank and projection $g'$ is not made, in which case the tongue will project beyond the surface of the holder, the pressure exerted longitudinally of the spindle will force the tongue inward into proper engagement, which will be maintained with increasing pressure, thereby practically forming a unitary structure of the holder and tool-shank, which is rendered more firm under pressure placed on the tool.

Owing to the fact that the chuck is entirely free from external projections, the said chuck is adapted to be driven into and frictionally held by the walls of the tapered socket formed in the spindle s of a boring or other similar machine.

My invention is applicable to wood-boring machines, milling-machines, tapping-machines, and, in fact, all machines employing a rotary spindle for the tool.

I claim—

1. The combination with a spindle having a tapered bore; of an insertible tapered tool-shank holder adapted to fit within said bore, said holder having a tool-shank socket; and pivoted means carried by the holder for retaining the tool-shank in position, said means being movable to a position with its outer surface flush with and forming a continuation of the outer surface of the holder, the opposing tapered surfaces of the spindle and holder coöperating, under pressure, to close said means upon the tool-shank with increasing pressure.

2. The combination with a spindle having a tapered bore; of an insertible holder for cylindrical tool-shanks comprising a socketed chuck having a tapered periphery adapted to fit within said bore; a shank-socket and a longitudinal slot communicating with the socket; and a tongue pivoted to the chuck and having a projection formed to enter the socket and engage a depression in a tool-shank inserted therein, said tongue being movable to a position with the outer surface thereof flush with the periphery of the chuck, the opposing tapered surfaces of the spindle and holder coöperating, under pressure, to close said tongue upon the tool-shank with increasing pressure.

3. The combination with a spindle having a tapered bore; of an insertible holder for cylindrical tool-shanks comprising a socketed chuck having a tapered periphery adapted to fit within said bore; a shank-socket and a longitudinal slot communicating with the socket; and a tongue pivoted to the chuck and having a projection formed to enter the socket and engage a depression in a tool-shank inserted therein, said tongue being movable to a position with the outer surface thereof flush with the periphery of the chuck, the opposing tapered surfaces of the spindle and holder coöperating, under pressure, to close said tongue upon the tool-shank with increasing pressure, said tongue having a cam at its inner end adapted to exert an outward displacing pressure on the tool-shank when the tongue is swung outwardly to release the normal engagement of tongue and shank.

In testimony whereof I have affixed my signature in presence of two witnesses.

JOSEPH A. COBURN.

Witnesses:
MICHAEL D. CREED,
FRED. E. BEAL.